United States Patent [19]

Hart, Jr.

[11] 4,107,525

[45] Aug. 15, 1978

[54] FLOWMETER DEVICE AND METHOD FOR DETERMINING VELOCITY OF A FLUID

[75] Inventor: Howard R. Hart, Jr., Schenectady, N.Y.

[73] Assignee: General Electric Company, Schenectady, N.Y.

[21] Appl. No.: 729,076

[22] Filed: Oct. 4, 1976

[51] Int. Cl.² ............................................. G01T 1/161
[52] U.S. Cl. .................................... 250/303; 250/356
[58] Field of Search ................ 250/302, 303, 356, 435

[56] References Cited

U.S. PATENT DOCUMENTS

| 3,261,976 | 7/1966 | Hull | 250/356 X |
| 3,842,670 | 10/1974 | Brain | 250/356 X |
| 3,889,120 | 6/1975 | Greaney | 250/356 |

*Primary Examiner*—Davis L. Willis

*Attorney, Agent, or Firm*—Richard G. Jackson; Joseph T. Cohen; Leo I. MaLossi

[57] ABSTRACT

A passive flowmeter device is described comprising a conduit for conducting fluid flow therethrough, means located at or near one end of the conduit for introducing fluid flow into the conduit, means located at or near the other end of the conduit for removing fluid flow therefrom and means for detecting the presence in the fluid of quantities of a specific tracer substance, said detecting means being disposed within the conduit intermediate the ends thereof. In one form of the device means are provided in communication with the conduit for introducing therein a preselected tracer substance. The device operates by enabling a comparison between the rate of diffusion of the tracer substance in the given fluid with the rate of flow of the fluid as evidenced by the density gradient of quantities of the tracer substance transported by the fluid.

6 Claims, 4 Drawing Figures

FLOWMETER DEVICE AND METHOD FOR DETERMINING VELOCITY OF A FLUID

BACKGROUND OF THE INVENTION

Certain prior art procedures for measuring low fluid flow rates are described in the Benson et al. paper "Thermal Mass Flowmeter" (Industrial and Control Systems, February, 1970, p. 85) and in the Hawk et al. article "Measuring Small Gas Flows into Vacuum Systems" (The Journal of Vacuum Science and Technology, Volume 6, No. 1, p. 255). The Hawk et al. article makes reference to classic procedures for measuring small gas flow rates, e.g. soap bubbles. However, basically both of these references relate to thermal mass flowmeters the operation of which is based upon relating the mass flow of a gas to a heat absorption process.

It would be of considerable advantage to the art to have available a low impedance, low flow-rate meter operating passively, i.e. not requiring power.

DESCRIPTION OF THE INVENTION

In order to facilitate the description of the instant invention, certain terms are defined as follows:

The term "tracer substance" designates an identifying molecule, atom or group of atoms from which detectable emanations occur or a molecule or group of atoms able to interact physically or chemically with a detector in the presence of the fluid whose flow is being measured.

The term "fluid" is intended to encompass both gases and liquids.

Thus, a tracer substance may itself have the capability for releasing detectable emanations, or may have been provided with this property by means of tagging (i.e. chemical integrations thereinto of a radioactive isotope or fluorescent group). Also, interaction of the tracer substance with a detector material may encompass selective chemical reaction therewith, adsorption of the tracer or absorption of the tracer.

In order to utilize any given tracer substance, its diffusion constant in the fluid, the flow of which is being measured, must be known or determinable.

The flowmeter device of this invention is a low impedance, low-flow rate meter that may be made without need for power input and, when operated using radioactive tracer substances, is fundamentally self-calibrating. The device comprises a conduit for conducting fluid flow therethrough, means located at or near one end of the conduit for introducing fluid flow into the conduit, means located at or near the other end of the conduit for removing fluid flow therefrom and means for detecting the presence in the fluid of quantities of a specific tracer substance, said detecting means being in communication with the interior of the conduit intermediate the ends thereof so as to sense the presence of tracer substance. In its more common form, means are provided in communication with the conduit for introducing therein a preselected tracer substance.

Where a chemical reactant is to be employed as a tracer substance, there may be employed as tracer introducing means a metering unit for introducing a chemical reactant at a fixed rate.

The device operates by comparing the rate of diffusion of some preselected tracer substance with the rate of flow of the fluid, the latter parameter being evidenced by the transport of quantities of the tracer substance by the fluid.

The invention finds particular utility in the determination of velocities in the range of from about $5 \times 10^{-4}$ cm/sec. to greater than about $5 \times 10^{-3}$ cm/sec. It is proposed that measurements of such small flows will be of interest in geophysical research in determining whether, and to what extent, terrestrial gas flows exist.

The basis of operation of the invention is most easily understood, but is not limited to, the arrangement in which the tracer substance is introduced into the flow from a localized source intermediate the ends of the conduit whereby means for detecting the specific tracer substance are disposed along the length of the conduit to each side of the localized source of tracer. The tracer substance selected must be able to be diffused in the given fluid flow in order that, when released, it will diffuse along the conduit in both directions through the fluid medium filling the tube. With the fluid medium stationary, the profile developed reflecting the density of the tracer distribution resulting from diffusion at various stations upstream and downstream of the tracer source will be symmetrical. Initiation of a small fluid flow will promote downstream movement of the tracer and introduce an asymmetry into this density profile (i.e. the symmetrical profile is skewed), which asymmetry becomes easily measurable when the drift distance becomes comparable to the diffusion distance. In all instances the requisite information as to the movement of the tracer is obtained by examination of the detectors, or by readout therefrom.

In the post-transient state (when the steady state has been reached) in a system employing radioactive tracers the following derivation applies:

$$\rho(Z \geq 0) = \left[\frac{Q \lambda t}{L_+ + L_-}\right] \cdot \exp\left[-\frac{Z}{L_+}\right]$$

$$\rho(Z \leq 0) = \left[\frac{Q \lambda t}{L_+ + L_-}\right] \cdot \exp\left[\frac{Z}{L_-}\right]$$

$$L_{\pm}^{-1} = \mp \frac{V}{2D} + \left[\left(\frac{V}{2D}\right)^2 + \frac{\lambda}{D}\right]^{\frac{1}{2}}$$

D = diffusion constant
$\phi$ = Radiation Density
Q = Radiation Source Strength
t = Exposure Time
$\lambda$ = Radioactive Decay Rate ($\lambda = 0.693/\tau_{1/2}$)
Z = the distance upstream (−) or downstream (+) from the radiation source This expression reduces to:

$$v = D \cdot \left(\frac{1}{L_-} - \frac{1}{L_+}\right). \tag{1}$$

$1/L_+$ is derived experimentally from the slope of the downstream radiation density profile plotted on a log scale, $1/L_-$ is derived experimentally from the slope of the upstream radiation density profile plotted on a log scale. Background for this analysis may be found in the text "Diffusion in Solids, Liquids, Gases" by W. Jost (Academic Press, New York, 1952, pp. 58, 59).

In the transient state (t is between 0 and $3/\lambda$, depending upon the precision desired) the solutions for a system employing radioactive tracers are best obtained numerically starting with the expression for an instantaneous source of a tracer:

$$(4 \pi D t)^{-1/2} \cdot \exp(-\lambda t - Z^2/4Dt) \quad (2)$$

and using a moving frame of reference. The more convenient approach is to utilize a properly programmed digital computer to obtain these solutions. Basis for this form of analysis is to be found in the text "Conduction of Heat in Solids" by H. S. Carslaw and J. C. Jaeger (2nd Edition, Oxford at the Clarendon Press, 1959, p. 257). The Jost and Carslaw et al. texts are incorporated by reference.

The above analyses are for a conduit having a uniform cross-section. If the channel is not uniform in cross-section or if it is of a length shorter than several times the value for $(D/\lambda)^{1/2}$, care must be taken to account for the boundary conditions at the ends of the conduit and at changes in cross-section, such, as for example, occurs in the event there is a mismatch between the size of the tubes or lines bringing fluid to and removing fluid from the flowmeter of this invention and the flowmeter itself.

Although, as noted above, the invention is most easily understood with respect to an asymmetric tracer density profile, the velocity may be determined using the device of this invention to obtain a determination of either the upstream (from the source) slope of the tracer density profile or the downstream slope of the tracer density profile or in an arrangement in which the incoming flow has a specific tracer substance entrained or dissolved therein (e.g. radon-222, an alpha particle-emitting gas produced during the decomposition of uranium).

Because of the pressure dependence of the diffusion coefficient of tracers in gases at constant temperature, the flowmeter device of this invention is inherently a mass flowmeter, when measuring gases. Calibration, of course, is temperature dependent, but the range of temperatures at which the device would be operated can be limited to simplify this aspect.

Detectors for use in this invention will vary depending upon the nature of the tracer substance and upon the method of detection of the tracer. Thus, detection may be effectuated by recording the impact of specific radiation, by bringing about a chemical reaction, adsorption or absorption of the tracer material, etc. In each case, the detector must be capable of providing a reliable record of the incidents of tracer arrivals at that given station along the conduit and must be inert to the particular fluid flow being measured.

If the tracer substance is radioactive, the radioactivity to be detected may be alpha, beta, or gamma radiation. Detectors for any of these types of radiation are well known. The detectors may be active and powered, or passive and not requiring power. In the case in which the tracer substance is an alpha particle-emitting gas, the detectors may be electronic detectors, etched-track detectors or photographic film, for example. Gamma rays can be detected by conventional gamma ray counters comprising a tubing having a scintillator crystal at the aperture end and a photocathode at the output end. Both gamma rays and beta radiation can be detected by the use of photographic emulsions. A conventional beta ray counter may be used for detecting beta radiation, such a counter comprises a sealed gas-filled tubing having an electrode therein connected to a source of relatively high voltage such that the beta rays ionize the gas and each gas ionization event is detected by an electronic amplifier and readout device.

Although discreet detector units can be disposed at specific locations along the conduit, it is also feasible to employ one continuous strip of detector material in the case of an etched-track detector or photographic film. In the case of the use of gamma ray or beta ray counters, the conduit wall must be provided with appropriate windows.

When etched-track detectors are employed to record the events of alpha particle impingement thereon, if the dimensions of the conduit are not such that a large percentage of the radioactive gas employed is disposed such that a sufficiently thick volume of gas must be traversed by the alpha particles released thereby before they reach the track detector material, it may be necessary to secure a thin cover film over the track detector material in order to slow down the alpha particles. A suitable material would be a layer of Mylar ® plastic about 0.002 cm. thick.

Solid state track-registration material for the detection of alpha particles is described in U.S. Pat. No. 3,665,194 — Alter et al. Also, the manner of processing of the exposed track-registration material is described therein. This patent is incorporated by reference.

Detecting means for use with a chemical tracer preferably will provide a color change or shade change. The optical density gradient will be measured by eye or by the use of a densitometer.

Detecting means for use with a tracer to be adsorbed or absorbed thereon must be so selected that the tracer may be desorbed from various portions thereof to obtain a measure of the tracer captured in this manner.

BRIEF DESCRIPTION OF THE DRAWING

Subject matter of the instant invention for which protection is sought is presented as claims at the conclusion of the following description setting forth the manner and process of making and using the invention. This description and the accompanying drawing form part of the illustration of the invention and the best mode thereof.

MANNER AND PROCESS OF MAKING AND USING THE INVENTION

Whether the flowmeter device of the instant invention is to be employed for measuring the velocity of gas flows or the velocity of liquid flows, in the best mode contemplated the generator of the tracer substances is a radioactive material and the device employs passive detecting means. The following description relates to such a structure, however, the invention is not so limited.

Figure 1:
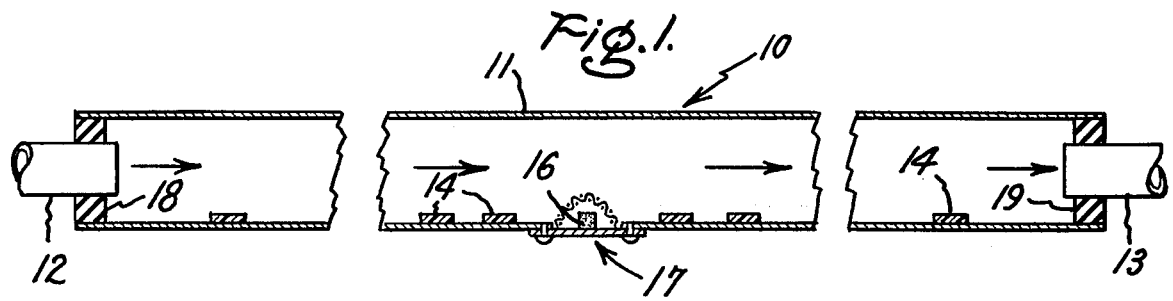
FIG. 1 is a schematic illustration of an embodiment of this invention wherein the source of a preselected tracer substance forms part of the device and accommodation is made at the ends of a conduit.

In the schematic representation in FIG. 1 detector 10 comprises a conduit 11, inlet tubing 12, outlet tubing 13, detectors 14 and source 16 of radiation-emitting tracer gas in housing, or assembly, 17. The length of conduit 11, which may be straight or bent into some convenient shape for ease of packaging, will depend upon the half life of the radioactive tracer introduced at the source 16. Thus, an aluminum tube 12 feet long has been employed in connection with a uranium-238 source yielding radon-222 for which the half life is 3.82 days. If a thorium source yielding radon-220, which has a half life of 56 seconds were to be employed, conduit 11 could be much shorter. The decay product of either of these radioactive gases is alpha particle radiation, which can be detected by a cellulose nitrate etched-track detector, which may take the shape of a continuous strip of cellulose nitrate along the inside of the tube in place of the separate detectors 14 shown at specific stations along conduit 11.

The best mode contemplated for the invention is the use of an alpha particle-emitting gas as the tracer and, therefore, the balance of the description will relate to the use of a radiation source 16, which yields radon-222. The diffusion constant of radon in air is roughly 0.1 cm$^2$/sec., with the exact value depending upon the temperature and pressure and is able to be determined by routine experimentation.

Figure 2:
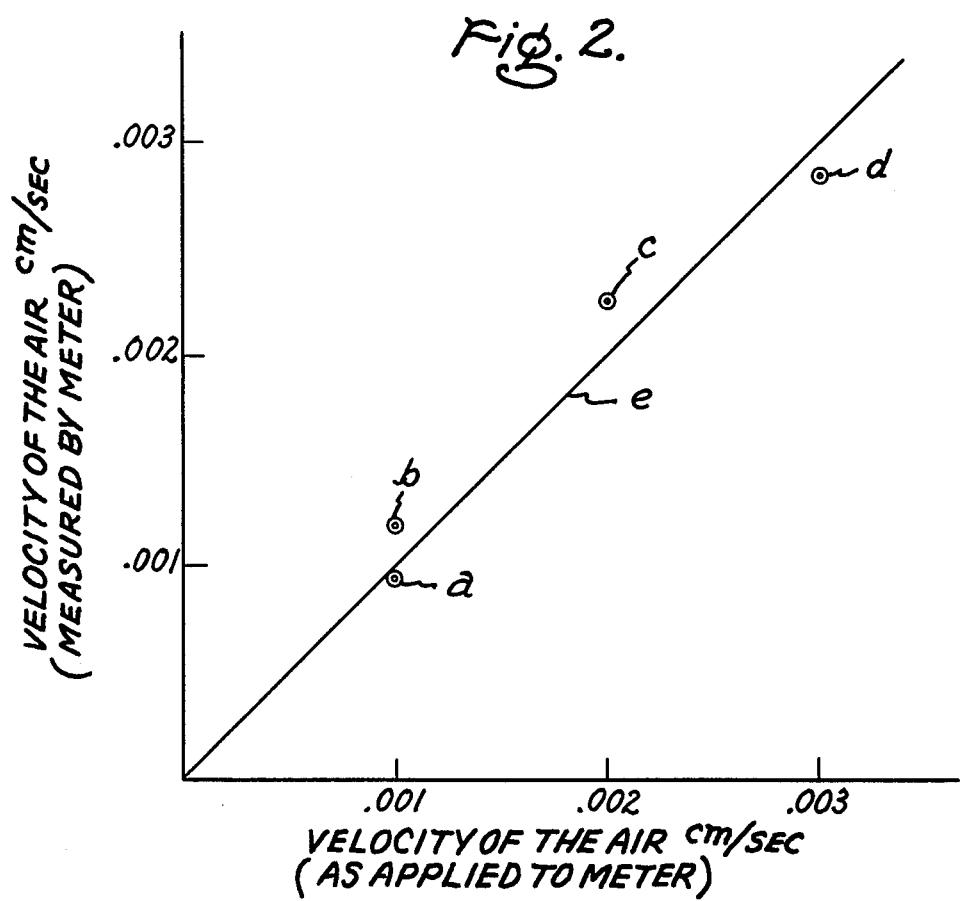
FIG. 2 is illustrative of the exceptionally good correlation between known velocities of fluid flow applied to the flowmeter and the velocities of this same flow as measured in accordance with the practice of this invention.

Such a device employing uranium-238 as radioactive source 16 has been tested by applying to the flowmeter device a known, measured inflow via pipe 12. Operation was conducted in the manner to be described hereinbelow and the results achieved are shown in FIG. 2. Thus, two test results designated points $a$ and $b$, respectively, were obtained at an inflow of air via tube 12 at the known velocity of 0.001 cm/sec.; one test result, point $c$, was obtained at an inflow of air into conduit 11 via tube 12 having a known velocity of 0.002 cm/sec. and a fourth test result represented by point $d$ was obtained for an air input to the device having the known velocity of 0.003 cm/sec. The distribution of these points representing the test results relative to a straight line $e$ drawn at 45° to the coordinants indicates the close correlation that is obtained with the device of this invention. It is estimated, based upon experiments, that this device is accurate to about 0.0003 cm/sec.

The operating procedure for flowmeter 10 requires that the diffusion constant for the radioactive tracer gas in the fluid, the velocity of flow of which is to be determined, must be known, or determinable. The period for which the reading is to be taken is to be preselected and the configuration to be utilized for the conduit is to be set.

Figure 3:
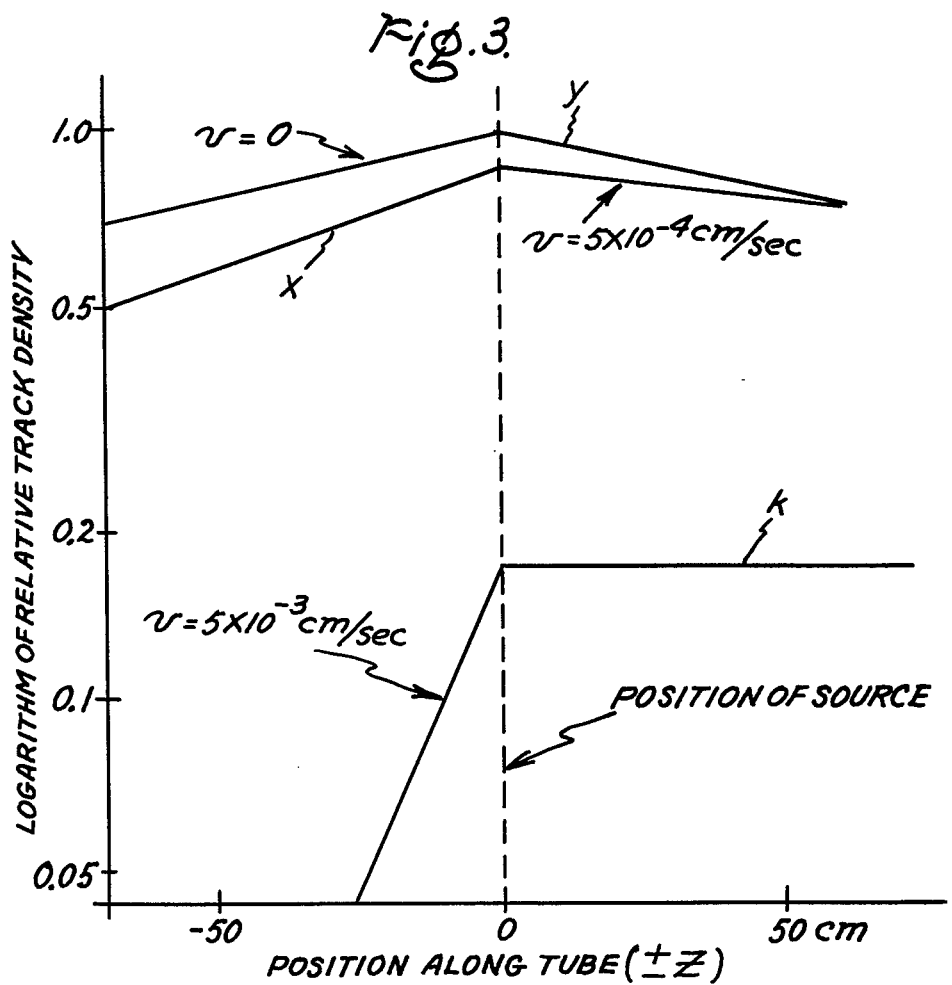
FIG. 3 is a graph illustrating relative track density as a function of detector position relative to the source for fluid flow velocities specified therein.

The flow of gas to be determined is admitted into flowmeter 10 and permitted to reach a steady state for flow in and flow out. Next, assembly 17 containing radioactive source 16 is fastened into place covering the hole therefor whereby the radon tracer gas is introduced into the gas flow. The test is continued until the end of the preselected test period, e.g. 12 days, and then the flowmeter is disassembled by removing end plugs 18, 19 to gain access to detectors 14, which are identified in a manner to properly correlate a given detector with the station which it occupied during the test. These detectors are then processed to determine the track density, i.e. the number of impingements thereon of alpha particles and these values are employed to develop a curve such as curve $x$ in FIG. 3. As may be seen from the drawing the portions of curve $x$ ($v = 5 \times 10^{-4}$ cm/sec.) falling on opposite sides of the position of the source 16 have different slopes and the value of each of these is readily determinable. Additional curves $y$ and $k$ represent the track densities obtained for values of $v = 0$ and $v = 5 \times 10^{-3}$ cm/sec., respectively.

Next, if the test period extends into the post-transient state referred to hereinabove, the velocity may be determined directly from equation (1).

Figure 4:
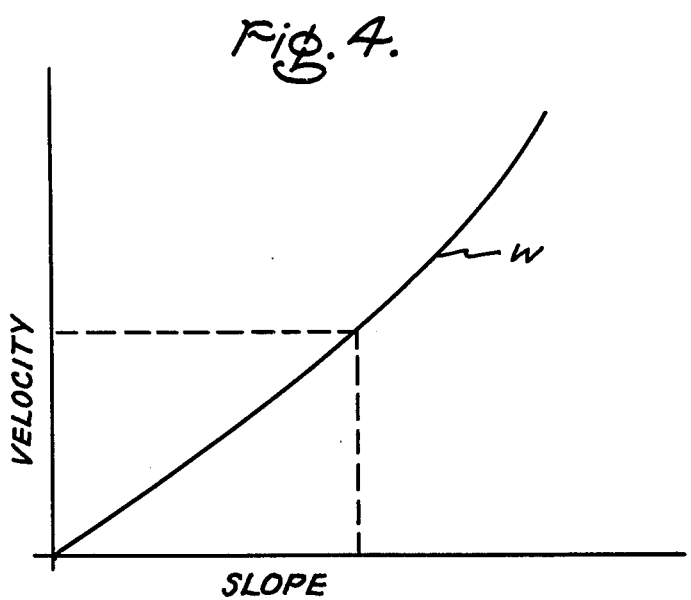
FIG. 4 is an illustrative curve for determining fluid flow velocity in the transient state from a slope quantity derived from a curve such as curve $x$ in FIG. 3.

If, on the contrary, the test period is such that the system is in the transient state, the procedure in connection with expression (2) must be employed in the manner indicated in FIG. 4. Thus, using this expression, curve $w$ is obtained by calculation, curve $w$ being specific to a test period of a given number of days. The slope determinations made from curve $x$ are employed to yield a readout from the graph in FIG. 4. FIG. 4 would have one shape for a non-asymmetric readout utilizing only the portion of the curve upstream of the location of the radiation source or the portion of the curve downstream thereof and a different shape if an asymmetric readout is employed, i.e. both slopes of curve $x$. In the former case, entry into the graph of FIG. 4 along the abscissa is obtained utilizing the slope of that given curve, while in the latter case entry into the graph of FIG. 4 is obtained by taking the difference between the slopes of the two portions of curve $x$, i.e. the slope of the upstream portion less the slope of the downstream portion. As is shown by the dotted projection lines the value of the slope (or difference in the slopes) yields a particular velocity for the fluid depending upon where the upper projection of this value of the slope intersects curve $w$.

Calculations indicate that by using small diameter tubes (assuming a low impedance is maintained) a significant increase in accuracy can be obtained over prior art flowmeters (e.g. thermal mass flowmeters) in the measurement of small gas flows.

Two applications of this invention to geophysical research will prove useful in determining whether or not (and to what extent) subterranean gas flow occurs.

In the first of these applications a bore hole is drilled into the earth. The lower end is, or is made, substantially impermeable to gases and a pair of permeable regions are defined at spaced vertical locations along this bore hole. These permeable regions are placed in flow communication with opposite ends (by connecting tubes) of the flowmeter of this invention.

In the second application, which is useful in connection with a known deep deposit of uranium ore, a bore hole is drilled to a point adjacent the deposit. Next a plurality of vertically spaced solid state tract detectors are suspended in the bore hole for a preselected period of time. Thereafter, the detectors are removed and the alpha particle damage track density on the individual detectors is determined. Next the flow velocity, if any, of gases in the bore hole can be determined as a function of drift and diffusion of the radon-222 emanating from the uranium deposit. In this instance the bore hole functions as conduit 11 and the entering gas already contains the tracer required.

What I claim as new and desire to secure by Letters Patents of the United States is:

1. The method for determining the velocity of a fluid containing a known tracer substance having a known diffusion constant in said fluid, comprising the steps of:

conducting at least some of said fluid through a conduit for a preselected period of time, detecting the pattern of movement of said tracer substance in terms of tracer density along said conduit under the combined influences of diffusion in, and transport by, the fluid, and deriving from said information of tracer density the velocity of said fluid by (a) plotting the logarithm of the tracer density along said conduit as a function of distance, (b) calculating the scope of at least a portion of any resulting curve, and (c) determining the velocity from a calibration curve for said device specific to said preselected period of time plotted for velocity as a function of slope.

2. The method recited in claim 1 in which the tracer substance is deliberately introduced.

3. The method of claim 1 wherein the tracer substance is radioactive.

4. The method of claim 3 wherein the radioactive substance is an alpha particle-emitting gas.

5. The method of claim 3 wherein the radioactive substance is a beta radiation-emitting gas.

6. The method of claim 3 herein the radioactive substance is a gamma radiation-emitting gas.

* * * * *